(12) United States Patent
Dimitriadis et al.

(10) Patent No.: US 9,892,745 B2
(45) Date of Patent: Feb. 13, 2018

(54) AUGMENTED MULTI-TIER CLASSIFIER FOR MULTI-MODAL VOICE ACTIVITY DETECTION

(71) Applicant: AT&T Intellectual Property I, L.P., Atlanta, GA (US)

(72) Inventors: Dimitrios Dimitriadis, Rutherford, NJ (US); Eric Zavesky, Austin, TX (US); Matthew Burlick, Kearny, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 679 days.

(21) Appl. No.: 13/974,453

(22) Filed: Aug. 23, 2013

(65) Prior Publication Data

US 2015/0058004 A1 Feb. 26, 2015

(51) Int. Cl.
*G10L 15/24* (2013.01)
*G10L 25/78* (2013.01)
*G10L 25/84* (2013.01)
*G06K 9/00* (2006.01)

(52) U.S. Cl.
CPC ............ *G10L 25/78* (2013.01); *G10L 25/84* (2013.01); *G06K 9/00335* (2013.01); *G10L 15/24* (2013.01)

(58) Field of Classification Search
CPC ......... G10L 25/78; G10L 25/84; G10L 15/24; G06K 9/00335
USPC .................................. 704/215, 233; 382/181
See application file for complete search history.

(56) References Cited

U.S. PATENT DOCUMENTS

| 6,570,610 | B1* | 5/2003 | Kipust | G06F 21/35 |
| | | | | 348/156 |
| 7,430,324 | B2 | 9/2008 | Gupta et al. | |
| 7,742,641 | B2 | 6/2010 | Ivanov et al. | |
| 8,326,637 | B2 | 12/2012 | Baldwin et al. | |
| 8,370,162 | B2 | 2/2013 | Faisman et al. | |
| 2003/0018475 | A1* | 1/2003 | Basu et al. | 704/270 |
| 2004/0056907 | A1* | 3/2004 | Sharma et al. | 345/863 |
| 2004/0260554 | A1* | 12/2004 | Connell et al. | 704/270 |
| 2004/0267536 | A1* | 12/2004 | Hershey et al. | 704/276 |
| 2005/0197843 | A1 | 9/2005 | Faisman et al. | |

(Continued)

OTHER PUBLICATIONS

Akdemir, et al. "Bimodal automatic speech segmentation based on audio and visual information fusion." Speech Communication 53.6, Jul. 2011, pp. 889-902.*

(Continued)

*Primary Examiner* — James Wozniak

(57) ABSTRACT

Disclosed herein are systems, methods, and computer-readable storage media for detecting voice activity in a media signal in an augmented, multi-tier classifier architecture. A system configured to practice the method can receive, from a first classifier, a first voice activity indicator detected in a first modality for a human subject. Then, the system can receive, from a second classifier, a second voice activity indicator detected in a second modality for the human subject, wherein the first voice activity indicator and the second voice activity indicators are based on the human subject at a same time, and wherein the first modality and the second modality are different. The system can concatenate, via a third classifier, the first voice activity indicator and the second voice activity indicator with original features of the human subject, to yield a classifier output, and determine voice activity based on the classifier output.

14 Claims, 4 Drawing Sheets

(56) References Cited

U.S. PATENT DOCUMENTS

| | | | |
|---|---|---|---|
| 2005/0216254 A1 | 9/2005 | Gupta et al. | |
| 2006/0224382 A1* | 10/2006 | Taneda | 704/233 |
| 2006/0235684 A1* | 10/2006 | Chang | G10L 15/30 704/233 |
| 2007/0061335 A1* | 3/2007 | Ramer | G06F 17/3064 |
| 2007/0136071 A1* | 6/2007 | Lee et al. | 704/270 |
| 2009/0299745 A1 | 12/2009 | Kennewick et al. | |
| 2012/0221330 A1* | 8/2012 | Thambiratnam | G10L 25/84 704/235 |
| 2012/0290297 A1* | 11/2012 | Baughman et al. | 704/233 |
| 2012/0290526 A1 | 11/2012 | Gupta et al. | |
| 2013/0013320 A1 | 1/2013 | Faisman et al. | |
| 2013/0144616 A1* | 6/2013 | Bangalore | G10L 15/1822 704/226 |
| 2014/0149177 A1* | 5/2014 | Frank | G06Q 10/06 705/7.29 |

OTHER PUBLICATIONS

Almajai, et al. "Using audio-visual features for robust voice activity detection in clean and noisy speech." Signal Processing Conference, 2008 16th European. IEEE, Aug. 2008, pp. 1-5.*
Blauth, Dante A., et al. "Voice activity detection and speaker localization using audiovisual cues." Pattern Recognition Letters 33.4 , Mar. 2012, pp. 373-380.*
Chen, Yan-Ying, et al. "Audio-visual information fusion for SVM-based biometric verification." Cellular Neural Networks and Their Applications, 2005 9th International Workshop on. IEEE, May 2005, pp. 300-303.*
Datcu, Dragoş , et al. "Emotion recognition using bimodal data fusion." Proceedings of the 12th International Conference on Computer Systems and Technologies. ACM, Jun. 2011, pp. 122-128.*
Lingenfelser, Florian, et al. "A systematic discussion of fusion techniques for multi-modal affect recognition tasks." Proceedings of the 13th international conference on multimodal interfaces. ACM, Jan. 2011, pp. 19-26.*
Petsatodis, Theodoros, et al. "Voice activity detection using audio-visual information." Digital Signal Processing, 2009 16th International Conference on. IEEE, Jul. 2009, pp. 1-5.*
Potamianos, Gerasimos, et al. "Recent advances in the automatic recognition of audiovisual speech." Proceedings of the IEEE 91.9, Sep. 2003, pp. 1306-1326.*
Shivappa, Shankar, et al. "Audiovisual information fusion in human-computer interfaces and intelligent environments: A survey." Proceedings of the IEEE 98.10, Aug. 2010, pp. 1692-1715.*
Takeuchi, Shin'ichi, et al. "Voice activity detection based on fusion of audio and visual information." Proc. AVSP. Sep. 2009, pp. 151-154.*
Glotin, Hervé, et al. "Weighting schemes for audio-visual fusion in speech recognition." Acoustics, Speech, and Signal Processing, 2001. Proceedings.(ICASSP'01). 2001 IEEE International Conference on. vol. 1. IEEE, May 2001, pp. 173-176.*
Kim et al., "Investigating the audio-visual speech detection advantage," *Speech Communication*, vol. 44, No. 1-4,pp. 19-30, Oct. 2004.
Almajal et al., "Using audio-visual features for robust voice activity detection in clean and noisy speech," in *16th European Signal Processing Conference (EUSIPCO)*, 2008.
Papandreou et al., "Adaptive multimodal fusion by uncertainty compensation with application to audiovisual speech recognition," IEEE *Transactions on Audio, Speech, and Language Processing*, vol. 17, No. 3, pp. 423-435, Mar. 2009.
Liu et al., "A visual voice activity detection method with adaboosting," *IET Seminar Digests*, vol. 2011, No. 4, pp. 8-12, 2011.
Sodoyer et al., "An Analysis of visual speech information applied to voice activity detection," in *Proc. IEEE International Conference on Acoutics, Speech and Signal Processing, 2006, ICASSP 2006*, vol. 1, p. I, May 2006.
Siatras et al., "Visual lip activity detection and speaker detection using mouth region intensities," in *IEEE Trans. Circuits and Systems for Video Technology*, vol. 19, No. 1, pp. 133-137, Jan. 2009.
Zhao et al., "Combining dynamic texture and structural features for speaker identification." in *Proceedings of the 2nd ACM workshop on Multimedia in forensics, security and intelligence*, New York, NY, USA, MiFor '10, pp. 93-98, 2010.
Yoshida et al., "An Improvement in Audio-Visual Voice Activity Detection for Automatic Speech Recognition," IEA/AIE 2010, pp. 51-61, 2010.
Takeuchi et al., "Voice Acitivity Detection based on Fusion on Audio and Visual Information," AVSP 2009, Norwich, pp. 151-154, Sep. 10-13, 2009.
Nigay et al., "A Design Space for Multimodal Systems: Concurrent Processing and Data Fusion," INTERCHI '93, pp. 172-178, Apr. 24-29, 1993.

* cited by examiner

AUGMENTED MULTI-TIER CLASSIFIER FOR MULTI-MODAL VOICE ACTIVITY DETECTION

BACKGROUND

1. Field of the Disclosure

The present disclosure relates to processing multi-modal inputs and more specifically to a tiered approach to incorporating outputs from multiple outputs from multiple classifiers, such as detecting voice activity via an audio classifier and a visual classifier.

2. Introduction

Voice activity detection (VAD) attempts to detect human voice activity. Detecting human voice activity can have multiple applications, but one specific example is to know when to engage a speech recognizer. Given a high acoustic signal-to-noise ratio (SNR), the information carried by an acoustic signal provides excellent data on which to detect voice activity. However, audio-only VAD (A-VAD) performance decreases rapidly as acoustic SNR decreases.

Much in the same way that humans detect voice activity in each other, VAD can rely on multiple modalities, such as acoustic and visual information, known as audio-visual voice activity detection (AV-VAD). However, when computer AV-VAD systems process multiple modalities, one large question is how to fuse information provided by multiple modalities. Existing AV-VAD systems address this problem via feature fusion or decision fusion, but fail to incorporate or consider features with classifier output.

Some existing approaches for fusing features extracted from multiple modalities are naïve approaches, like feature concatenation and majority voting, while others are more sophisticated and blend the responses based on acoustic SNR or feature uncertainty. However, all of these approaches either assume prior knowledge of the acoustic SNR or a predetermined model of feature uncertainty. Furthermore, all of the approaches consider only a few multi-modal features and do not utilize the broad set of available information and failing to consider interactions between features.

BRIEF DESCRIPTION OF THE DRAWINGS

In order to describe the manner in which the above-recited and other advantages and features of the principles disclosed herein can be obtained, a more particular description of the principles briefly described above will be rendered by reference to specific embodiments thereof which are illustrated in the appended drawings. Understanding that these drawings depict only example embodiments and are not therefore to be considered to be limiting of its scope, these principles will be described and explained with additional specificity and detail through the use of the accompanying drawings in which.

DETAILED DESCRIPTION

Figure 1:
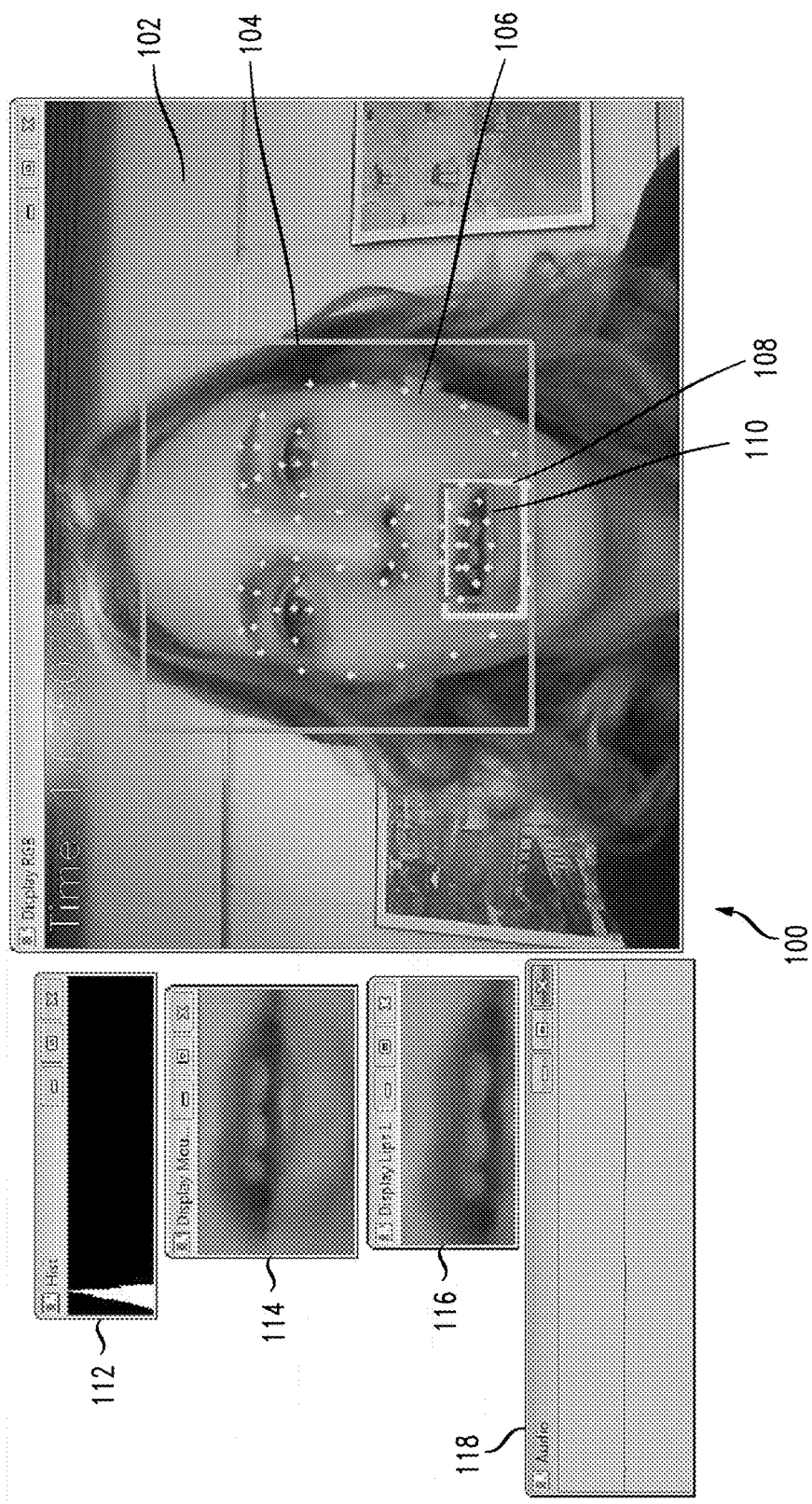
FIG. 1 illustrates an example video frame and various types of features extracted from the video frame.

This disclosure first presents a general discussion of hardware components, which may be used in a system or device embodiment. Following the discussion of the hardware and software components, various embodiments shall be discussed with reference to embodiments in which solve the problems of detecting when a user is speaking using multi-modal input. An augmented multi-tier classification system can combine both feature fusion (often referred to as early fusion) and decision fusion (often referred to as late fusion) by allowing individual independent classifiers to provide feedback and using the feedback, in combination with the raw fused features, as inputs to a second classifier. The augmented multi-tier classification system can concatenate vectors representing the output of a set of base classifiers with the original fused features to augment the output.

The augmented multi-tier classification system can incorporate a wide variety and quantity of features. Independent classifiers are a first tier, each of which classifies one of the features as inputs, and provides the classification output to the second tier classifier in the multi-tier system. By taking into account raw features in addition to the output of first tier classifiers for the training of a second classifier, the augmented multi-tier classification system can learn when to apply rules learned by the first-tier, creating dynamically switched decision planes based on input features.

The augmented multi-tier classification system can perform instantaneous or near-instantaneous AV-VAD. The augmented multi-tier classification system can examine a frame of audio/video, and classify the frame as speech or non-speech with no requirements for any of the following or preceding frames. The augmented multi-tier classification system can output a classification of a current frame as a binary "contains speech" or "does not contain speech" decision and/or can output a certainty score that the current frame contains speech. In different scenarios or purposes, the individual classifier outputs can have different meanings such as "contains a face" or "does not contain a face," in the case of face recognition.

Various embodiments of this disclosure are discussed in detail below. While specific implementations are discussed, it should be understood that this is done for illustration purposes only. A person skilled in the relevant art will recognize that other components and configurations may be used without parting from the spirit and scope of the disclosure. Several examples are discussed in terms of determining whether a person is speaking in a particular frame of video. The principles and specific first tier classifiers can be expanded to include other problem domains, input of other modalities, and different types of classifiers. The concept of a multi-tier classification system can be developed independently of detecting speech, although detecting speech is a convenient subject for explaining these principles.

Figure 2:
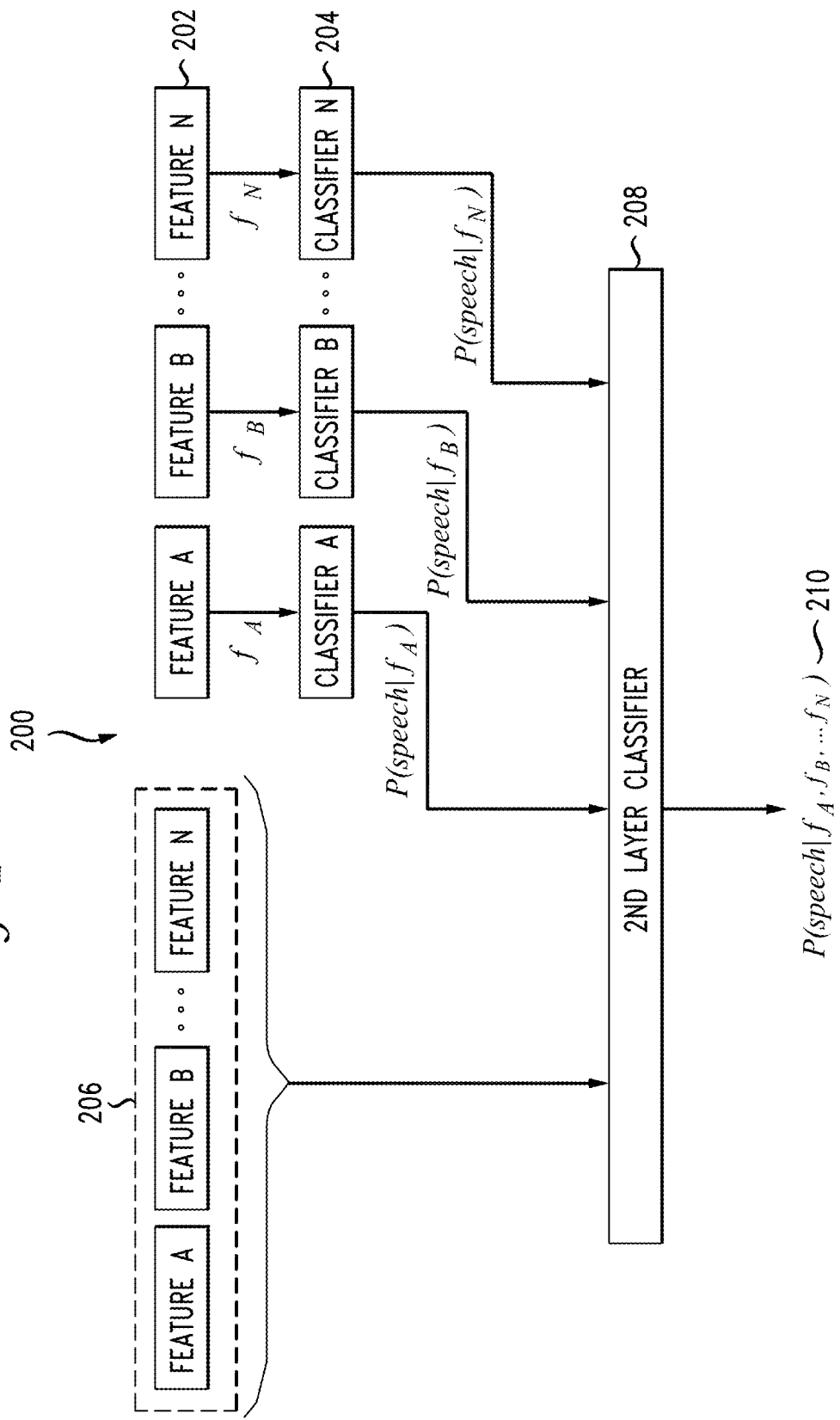
FIG. 2 illustrates an example augmented, multi-tier classifier architecture.

FIG. 1 illustrates an example user interface 100 for viewing a video frame 102 and various types of features extracted from the video frame 102. The video frame 102 can be provided as input to the various classifiers as shown in FIG. 2 and discussed below. The video frame 102 can be provided as part of a direct stream, media file, or removable media, etc. This example shows some complete or partial outputs from different classifiers. For example, one classifier can output a detected mouth 114, another classifier can output a cropped mouth 116. Another classifier can detect and output an RGB histogram 112 of the image. Yet another classifier can provide time-domain audio 118 for the image. The classifiers can overlay the video frame 102 with a face detector to 104 to narrow the search for a mouth and to determine more quickly whether the user is speaking. The classifiers can provide an active shape model 106 for the face, laid over the original video frame. Similar shape models exist for the lips 110. The classifiers can also optionally identify and overlay the video frame with the lips 108. While these features are discussed to illustrate one specific example of an augmented, multi-tier classifier architecture, the system can incorporate other features and/or classifiers, and can apply them in different domains beyond AV-VAD. Other features can include audio frequency components, audio amplitude, image saturation, image brightness, image texture, video motion, head movement, movement of a specific item in the video relative to other items or to the background, micro-expressions on a person's face, extremity of expression, detected lighting changes, head angle relative to the camera, and so forth. The features can be extracted from virtually any input stream. While video and audio are discussed herein in terms of AV-VAD, other input streams from which features can be extracted include text, geo-positioning data, accelerometer data, temperature, magnetic fields, and so forth. Virtually any data that can be captured or recorded via a sensor can be adapted for use as a potential source for extracting or identifying features with a classifier. The types of features and classifiers selected for use can depend on what the system is intended to detect. Although the examples herein are targeted for AV-VAD, the augmented, multi-tier approach to incorporating multiple different features, and outputs from multiple different classifiers can be applied to multiple problem domains, such as general speech recognition, specific task recognition, or aligning audio from different captured sources. In an example configuration for face recognition, the first tier of the augmented, multi-tier classifier can combine raw image features with output from learned classifiers. In another example, the system can classify emails as spam or non-spam based on features and output from classifiers regarding the content, context, or other attributes related to the email messages.

When detecting whether a user is speaking in a video segment or video frame, the system can incorporate outputs from various classifiers that independently analyze acoustic features such as zero-crossings, signal energy, and Mel-frequency cepstral coefficients (MFCCs). With respect to audio features, the illustrative examples discussed herein focus on MFCCs and audio segment signal energy, in addition to their first derivatives. Software such as the Intel AVCSR tracker can extract example MFCCs from audiovisual data. Then, the system can segment the acoustic data into 20 ms audio frames with 10 ms overlap, for example. While these segments are provided as examples, other segment sizes can be used, ranging from a single video frame to multiple seconds or more. Further, the segments may or may not overlap. The system can examine MFCCs of a closest audio frame for a given video frame, so the multi-modal inputs are temporally aligned to the extent possible. For example, given a video frame rate of 30 fps, video frames are approximately 33 ms apart, and therefore a single video frame can be associated with two complete audio frames (0-20 ms and 10-30 ms). Each of these audio frames can provide MFCC values. The system can choose to keep the last set of MFCC values as being temporally closest to the video frame. The system can split the data into 10 ms segments to compute the acoustic energy. The system can then compute the mean signal energy as the average energy for all the 10 ms segments. Similar to MFCCs, the system can also estimate the first time derivative of the average energy.

With respect to visual features, the system can incorporate features such as mouth height and width (lip dimensions), mouth region intensity distribution, and mouth region discrete cosine transforms (DCTs) and local binary patterns (LBPs) as well as their first time derivatives, and horizontal and vertical mean and variance vectors based on the optical flow. Other visual features can be used, depending on the specific application, and depending on the type and content of the visual data expected. For example, in speech detection, the lip dimensions can form a 2D feature vector using the estimated height and width. From the mouth region, the system can compute a 32-bin grayscale histogram, a 14D DCT feature, and a 256D LBP feature. The system can also use the first derivatives of these features to encode the feature dynamics. The vectors for different features can be different sizes or lengths. For example, a vector for the audio energy feature can have a size of 1, a vector for the video delta lip dimension feature can have a size of 2, and a vector for a video mouth LBP feature can have a size of 256. The size, number, and selection of vectors can vary for different applications. While these are a few specific examples to illustrate a particular use case of AV-VAD, the augmented, multi-tier classifier can use other features and vector sizes to accomplish different tasks. For example, vectors describing changes in audio volume can be used in a classification task of aligning audio from different captured sources.

The system can synchronize features for determining whether a particular segment contains speech. To guarantee synchronization between the audio and video streams, the system can flush an audio buffer after processing a previous video frame and populate the audio buffer with audio data until the next video frame. At this point, the system can down sample the audio to 16 kHz and extract both acoustic and visual features are extracted on the audio buffer and video frame. After preprocessing, acoustic and visual features can be available for every video frame.

The system can derive two sets of visual features (appearance-based and parameter-based) from the detected mouth regions. The system can extract appearance-based features after mouth regions are detected in one of three ways. First, the system can detect faces, such as via a pretrained Haar cascade. For each face found, the system can attempt to find the mouth using another pre-trained Haar cascade with its search region constrained to the lower half of the face. Second, if the system does not detect a mouth, the system can loosely fit a region around mouth points detected from a pre-trained Active Shape Model (ASM). Third, if the system is unable to fit an ASM model for the face, the system can heuristically select a region relative to the detected face region. From the mouth region the system can compute the intensity histogram, the DCTs, and the LBPs. The system can extract parameter-based features for lips from the detected mouth regions. After fitting an ASM to the mouth alone, the system can use pre-defined points on this model to compute the width and height of the lips. The system can extract acoustic features for each video frame, based on an accumulated buffer. The system can use the acoustic features stored in this buffer. The buffer can likewise store non-acoustic features of other types, such as detected movement or lighting changes in a video.

The disclosure turns now to the classifiers as shown in the example augmented, multi-tier classifier architecture 200 of FIG. 2. The example augmented, multi-tier classifier architecture 200 can accept, as input, an audio, audiovisual, or other signal, and provide as output, times when a speaker recorded in the signal starts and stops talking. The same multi-tier classifier architecture 200 can also apply to other types of classification tasks, such as determining whether a video frame contains a face, or determining whether a conversation in a chat room is discussing illegal activity. This classifier architecture 200 for voice activity detection is both robust to noise and generic enough to accommodate features of different types and dimensionality. Various features 202 are provided to multiple different classifiers 204, which are the first tier classifiers or base classifiers. This classifier architecture 200 provides an augmented multi-tier approach by combining concepts from both early fusion and late fusion. Specifically, a variety of classifiers 204 process the features 202 and provide outputs to a second tier classifier 208. The second tier classifier 208 also concatenates the fused features 206 with the outputs from the first tier classifiers 204 to generate the resulting output 210.

Output of each classifier 204 in each of the first tier classifiers may be binary, such as "voice activity detected" or "no voice activity detected," or non-binary, such as probabilities or scores on a spectrum of likely to less likely. The outputs from the first tier classifiers provide each classifier's "best guess" of whether a particular frame contains voice activity. The first tier classifiers can examine each feature, for example, such as delta MFCC or MFCC itself. As the classifiers 204 process each frame, the classifiers quickly classify the input and generate a predicted output. Similarly, the output 210 of the second tier classifier 208 can be binary, or can provide more detailed information about whether voice activity has been detected, such as where in the frame the activity was detected, a certainty that voice activity has been detected, which first tier classifier 204 was the most certain, whether previous or later frames were also detected to contain voice activity, and so forth. In one aspect, if a program calls the example augmented, multi-tier classifier architecture 200 via an Application Programming Interface (API), the program can indicate a level of detail about the output 210 to receive for a given frame or for a given medium to be analyzed. For example, a simple program may only want the binary output indicating whether the example augmented, multi-tier classifier architecture 200 detects voice activity for a given frame, while a more advanced or diagnostic program may want as much additional information as possible from the second tier classifier 208.

The classifiers 204 can include a wide range of types, such as Support Vector Machines (SVMs), Gaussian Mixtures of Models (GMMs), Artificial Neural Networks (ANNs), Decision Trees (DTs), and Random Forests (RFs). GMM classifiers are often used for VAD, speech processing, and speech recognition tasks, in both audio and video modalities. This classifier architecture 200 provides for instantaneous or near-instantaneous VAD classification free of temporal context requirements. Hidden Markov Models (HMMs) are often used to incorporate temporal information in collaboration with GMMs. The classifiers 204 can be for different types of features, or different classifiers for a same type of feature. For example, classifier A may process audio, classifier B may process video, and classifier C may process audio with a different focus, different engine, a different algorithm, or with some other parameter(s) different from classifier A. In another variation, a same classifier can process the same input multiple times with different settings to produce multiple outputs that may or may not correspond to each other. The classifiers can operate on audio and video from a same frame of the video, or can operate on data covering different timespans, which may or may not overlap. For example, when detecting whether a frame contains a voice, a first classifier can operate on audio of a current frame, a second classifier can operate on audio of the current frame and a previous frame, while a third classifier can operate on video of five previous frames and can exclude the current frame.

With respect to fusion classifiers, two approaches for fusing data from different modalities are comparable to the augmented multi-tier classifier for voice activity detection to evaluate the effectiveness or benefits of augmenting the classifier outputs. The first approach is "early fusion" or "feature fusion" where the features are combined and then trained and evaluated with a single classifier. The second approach is "late fusion" or "decision fusion" that uses the output of individual classifiers and determines a way to combine them to make a final decision. The system disclosed herein differs from these two approaches in that the system augments the output of a set of base classifiers with the original fused features for a final classifier.

Several early and late fusion methods were compared to the augmented multi-tier classifier for evaluation purposes. Early fusion methods included concatenating all feature vectors and training a classifier on those fused features, then selecting the most discriminating features using the Fisher Discriminant Ratio (FDR) and selected projected features using Linear Discriminant Analysis (LDA). To determine the number of features to keep, features were greedily removed (ranked by the FDR values or eigenvalues) and the features that provided the best training rate were chosen. Compared late fusion methods included evaluating majority voting and weighted majority voting. In weighted majority voting, the weights can be calculated according to the training success rate, as determined by validation on a sub-partition of training data. Alternatively, a user, trainer, or administrator can manually select or tune the weights. Different weights can be applied for various task domains, speakers, speaker types, vocabularies, different mixes or capabilities of the classifiers, and so forth. The weights can be equal for the output of each classifier. The weights can be dynamic based on a certainty score from each classifier indicating how certain the classifier is that the output is correct. For example, if classifier 1 is 20% certain that its output "voice activity detected" is correct, the system can assign a weight of 20 to that output, and if classifier 2 is 95% certain that its output "no voice activity detected" is correct, the system can assign a weight of 95 to that output. The weights can have a one-to-one correspondence with a certainty score, but can be translated according to some other scale. In one example, a neural network calculates the weights for the output of each classifier on the fly so that each output of each classifier is weighted based on its information content or certainty, whether in absolute terms or relative to the other classifiers. The weights can be adjusted at some interval, such as every frame analyzed, or at some interval of frames, such as every 10 frames. The weights can be calculated for different classifiers at different intervals. For example, weights for a video classifier may be calculated and updated at each frame, while weights for an audio classifier may be calculated and updated every 5 frames, or when volume of the audio passes a minimum threshold indicating that speech is likely. The system can likewise update a weight for one classifier based on the output of another classifier. For example, if output from a first classifier switches from "no voice activity detected" to "voice activity detected," the system can trigger a reevaluation and update of the weighting of output from a second classifier. Further, the weights can be determined based on classifier-specific training accuracy data. Training accuracy data indicating that a first classifier is more reliable than a second classifier may lead to the system assigning output from the first classifier a higher weight.

An example two-tier classifier for evaluation was created to maximize late fusion performance by treating the output of base classifiers (one built per feature vector) as input to a second classifier. By training a second classifier on the output of the base classifiers, the example two-tier classifier learned a non-linear way to best fuse those outputs. In one evaluated embodiment, the classifiers at both tiers are based on random forests.

The example non-augmented two-tiered classifier worked well, but was often outperformed by example simple fused feature classifiers and/or by weighted majority voting classifiers. Augmenting a multi-tier classifier to also include the raw fused features, as shown in FIG. 2, further improved classification results by leveraging the advantages of both the two-tiered approach and the fused feature approach. The augmented multi-tier classifier 200 allows a final classifier 208 to learn dynamic fusion strategies according to raw feature input.

One of the first tier classifiers 204 can be substituted for a group of similar classifiers, not shown, for processing a same, similar, or related feature, which feed to an intermediate classifier before passing the output to the final classifier 208. In this way, the tiered classifier architecture 200 can include a nested sub-architecture that is similarly tiered. For example, a group of classifiers can process audio, each using different algorithms, the outputs of which are combined through an intermediate classifier in a similar manner to how the final classifier 208 operates. Thus, while FIG. 2 illustrates a simple tiered or hierarchical classifier architecture 200, the system can incorporate more complex architectures with more than two tiers or including sub-tiers.

Figure 3:
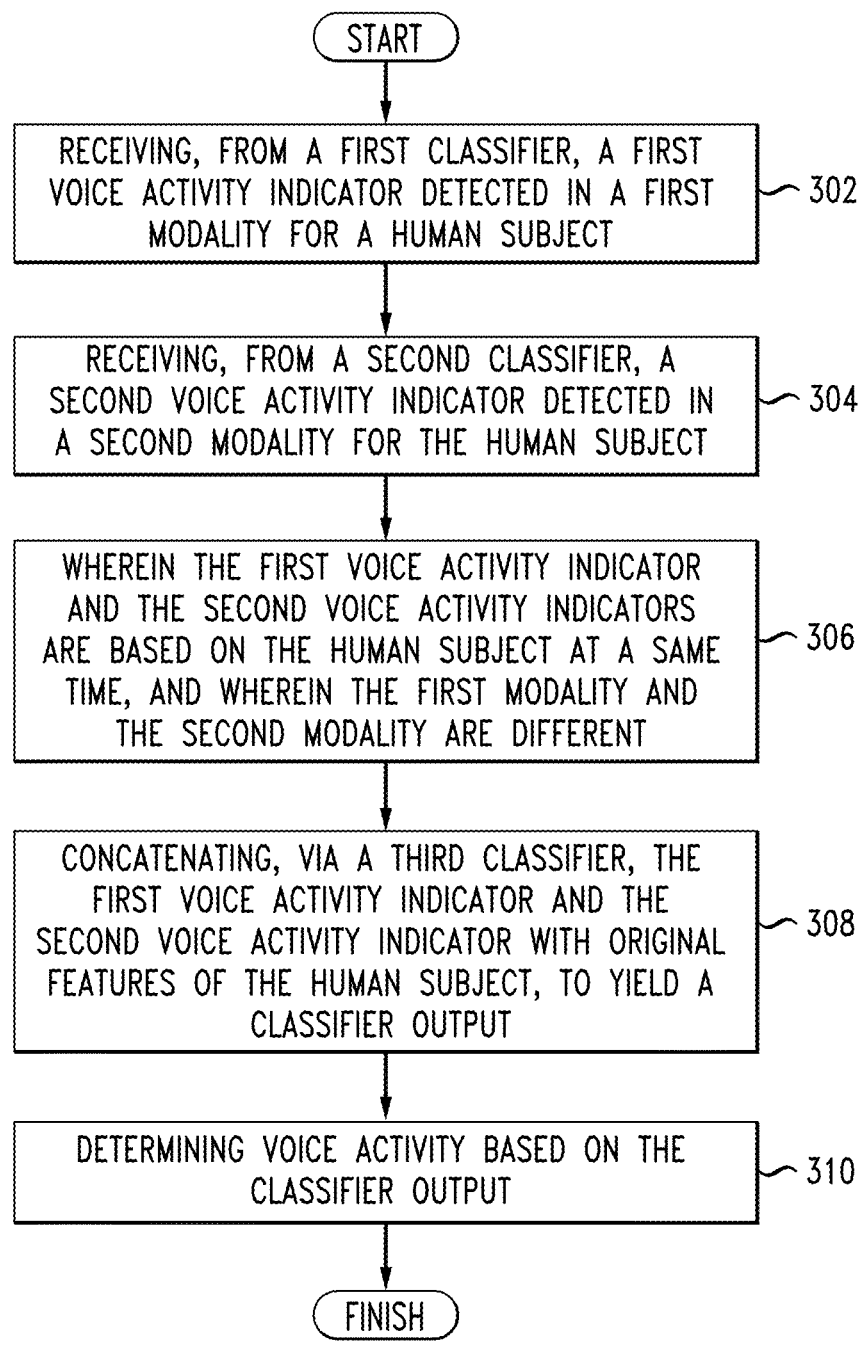
FIG. 3 illustrates an example method embodiment.
Figure 4:
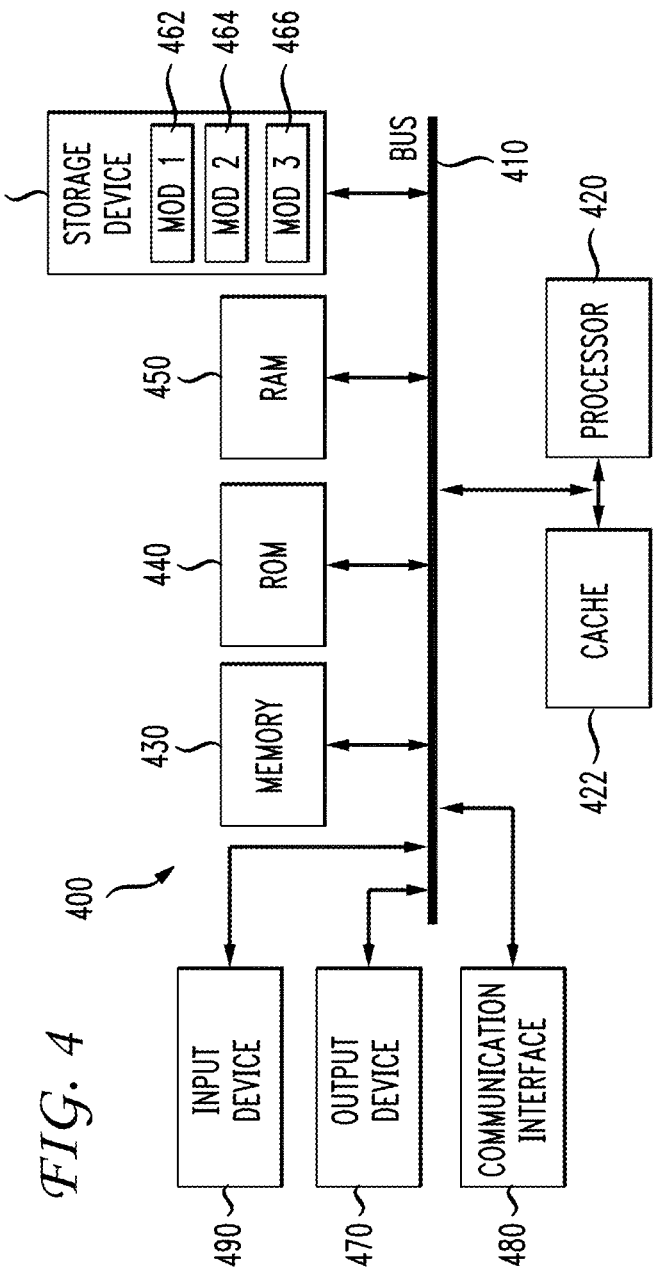
FIG. 4 illustrates an example system embodiment.

Having disclosed some basic concepts, the disclosure now turns to the exemplary method embodiment shown in FIG. 3 for detecting voice activity in a media signal in an augmented, multi-tier classifier architecture. For the sake of clarity, the method is discussed in terms of an exemplary system 400, as shown in FIG. 4, configured to practice the method. The steps outlined herein are exemplary and can be implemented in any combination, permutation, or order thereof, including combinations or permutations that exclude, add, or modify certain steps.

A system configured to practice the method can receive, from a first classifier, a first voice activity indicator detected in a first modality for a human subject (302). Then, the system can receive, from a second classifier, a second voice activity indicator detected in a second modality for the human subject (304), wherein the first voice activity indicator and the second voice activity indicators are based on the human subject at a same time, and wherein the first modality and the second modality are different (306). The system can concatenate, via a third classifier, the first voice activity indicator and the second voice activity indicator with original features of the human subject, to yield a classifier output (308), and determine voice activity based on the classifier output (310). While this example method discusses a human subject, the same principles can apply to a signal of any entity, and the disclosure is are not necessarily limited to "human subjects." The original features can be associated with a video frame. For example, the features can be extracted from a single frame, or from multiple frames. While one scenario is based on instantaneous computations, in other scenarios the system can aggregate information across multiple frames, such as all frames within a 2 second window, where that window can include samples forward or backward in time, relative to the classified sample.

The original features can include an acoustic feature and a visual feature, Mel-frequency cepstral coefficients, a first derivative of Mel-frequency cepstral coefficients, a second derivative of Mel-frequency cepstral coefficients, and acoustic energy. The visual feature can include at least one of a parametric feature, an appearance-based feature, dimensions of a mouth region, image region intensity, discrete cosine transformations, and local binary patterns. The system can temporally align various input features automatically, such as aligning an audio feature and a visual feature so that the second tier classifier 208 analyzes speech augmented multi-tier classifier 200. The system can grab a snippet of audio and match it to a corresponding video frame having a same timestamp, for example.

The mix and/or weighting of classifiers can be personalized for a specific speaker, and can be trained on his or her specific speaking patterns for a given time of day, for a given tasks, and so forth. The system can learn, over time, which mix and weights of classifiers provide more accurate results, and adapt accordingly.

A brief description of a basic general-purpose system or computing device in FIG. 4, which can be employed to practice the concepts, is disclosed herein. With reference to FIG. 4, an exemplary system 400 includes a general-purpose computing device 400, including a processing unit (CPU or processor) 420 and a system bus 410 that couples various system components including the system memory 430 such as read only memory (ROM) 440 and random access memory (RAM) 450 to the processor 420. The system 400 can include a cache 422 of high-speed memory connected directly with, in close proximity to, or integrated as part of the processor 420. The system 400 copies data from the memory 430 and/or the storage device 460 to the cache 422 for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer readable storage media provide nonvolatile storage of computer readable instructions, data structures, program modules and other data for the computing device 400. In one aspect, a hardware module that performs a particular function includes the software component stored in a non-transitory computer-readable medium in connection with the necessary hardware components, such as the processor 420, bus 410, display 470, and so forth, to carry out the function. The basic components are known to those of skill in the art and appropriate variations are contemplated depending on the type of device, such as whether the device 400 is a small, handheld computing device, a desktop computer, or a computer server.

Although the exemplary embodiment described herein employs the hard disk 460, it should be appreciated by those skilled in the art that other types of computer readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations discussed below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 4 can practice all or part of the recited methods, can be a part of the recited systems, and/or can operate according to instructions in the recited non-transitory computer-readable storage media. Such logical operations can be implemented as modules configured to control the processor 420 to perform particular functions according to the programming of the module. For example, FIG. 4 illustrates three modules Mod1 462, Mod2 464 and Mod3 466 which are modules configured to control the processor 420. These modules may be stored on the storage device 460 and loaded into RAM 450 or memory 430 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. The principles herein can apply to detection of characteristics or actions beyond voice detection. For example, the augmented multi-tier classifier can be applied to determine which phonemes are used in a signal. The augmented multi-tier classifier can apply to other domains, such as detecting a person's expressions, demeanor, or speaking tone. The outputs from these other domains can be binary, such as "voice activity detected" or "no voice activity detected," or can include richer descriptions depending on the requestor, the types of classifiers, or the type of signal. Essentially, the augmented multi-tier approach is applicable out to any problem domain in which a solution combines different modalities or data streams using different classifiers. Those skilled in the art will readily recognize various modifications and changes that may be made to the principles described herein without following the example embodiments and applications illustrated and described herein, and without departing from the spirit and scope of the disclosure.

We claim:

1. A method comprising:
   at a first time:
      receiving, from a first classifier, a first modality output detected from a voice input from a human subject; and
      receiving, from a second classifier, a second modality output detected from visual input from the human subject,
      wherein the voice input and the visual input are provided by the human subject at a same time, and wherein a mix and a weighting for the first classifier and the second classifier is based on speaking patterns for a given time of day for the human subject;
   providing, via a feedback loop, the first modality output to the second classifier, to yield an updated second classifier, wherein the first classifier and the updated second classifier comprise a classifier group;
   at a second time, after the first time:
      receiving classifier group output from the classifier group;
      concatenating, via a third classifier, the classifier group with original features of the human subject, to yield a classifier output, wherein the original features of the human subject comprise a temporal alignment of voice data associated with the first modality output and visual data associated with the second modality output; and
      determining voice activity based on the classifier output.

2. The method of claim 1, wherein an acoustic feature associated with the voice input comprises one of Mel-frequency cepstral coefficients, a first derivative of Mel-frequency cepstral coefficients, a second derivative of Mel-frequency cepstral coefficients, and acoustic energy.

3. The method of claim 1, wherein a visual feature associated with the visual input comprises one of a parametric feature, an appearance-based feature, dimensions of a mouth region, image region intensity, discrete cosine transformations, image saturation, image brightness, image texture, video motion, head movement, one of movement of a specific item relative to other items and movement of the specific item relative to a background, micro-expressions on a person's face, extremity of expression, detected lighting changes, head angle relative to a camera, and local binary patterns.

4. The method of claim 1, wherein the original features are associated with a video frame.

5. The method of claim 1, wherein concatenating the classifier group output with original features of the human subject further comprises:
   performing late fusion of the original features using weighted majority voting.

6. A system comprising:
   a processor; and
   a computer-readable medium having instructions which, when executed by the processor, cause the processor to perform operations comprising:
   at a first time:
      receiving, from a first classifier, a first modality output detected from a voice input from a human subject; and
      receiving, from a second classifier, a second modality output detected from visual input from the human subject,
      wherein the voice input and the visual input are provided by the human subject at a same time, and wherein a mix and a weighting for the first classifier and the second classifier is based on speaking patterns for a given time of day for the human subject;
      providing, via a feedback loop, the first modality output to the second classifier, to yield an updated second classifier, wherein the first classifier and the updated second classifier comprise a classifier group;
   at a second time, after the first time:
      receiving classifier group output from the classifier group;
      concatenating, via a third classifier, the classifier group output with original features of the human subject, to yield a classifier output, wherein the original features of the human subject comprise a temporal alignment of voice data associated with the first modality output and visual data associated with the second modality output; and
      determining voice activity based on the classifier output.

7. The system of claim 6, wherein an acoustic feature associated with the voice input comprises one of Mel-frequency cepstral coefficients, a first derivative of Mel-frequency cepstral coefficients, a second derivative of Mel-frequency cepstral coefficients, and acoustic energy.

8. The system of claim 6, wherein a visual feature associated with the visual input comprises one of a parametric feature, an appearance-based feature, dimensions of a mouth region, image region intensity, discrete cosine transformations, image saturation, image brightness, image texture, video motion, head movement, one of movement of a specific item relative to other items and movement of the specific item to a background, micro-expressions on a person's face, extremity of expression, detected lighting changes, head angle relative to a camera, and local binary patterns.

9. The system of claim 6, wherein the original features are associated with a video frame.

10. The system of claim 6, the computer-readable medium having additional instructions stored which, when executed by the processor, causes the processor to perform operation comprising:

performing, during the concatenating, late fusion of the original features using weighted majority voting.

11. A computer-readable storage medium storing instructions which, when executed by a computing device, cause the computing device to perform operations comprising:

at a first time:
receiving, from a first classifier, a first modality output detected from a voice input from a human subject; and
receiving, from a second classifier, a second modality output detected from visual input from the human subject,
wherein the voice input and the visual input are provided by the human subject at a same time, and wherein a mix and a weighting for the first classifier and the second classifier is based on speaking patterns for a given time of day for the human subject;
providing, via a feedback loop, the first modality output to the second classifier, to yield an updated second classifier, wherein the first classifier and the updated second classifier comprise a classifier group;

at a second time, after the first time:
receiving classifier group output from the classifier group;
concatenating, via a third classifier, the classifier group output with original features of the human subject, to yield a classifier output, wherein the original features of the human subject comprise a temporal alignment of voice data associated with the first modality output and visual data associated with the second modality output; and
determining voice activity based on the classifier output.

12. The computer-readable storage medium of claim 11, wherein an acoustic feature associated with the voice input comprises one of Mel-frequency cepstral coefficients, a first derivative of Mel-frequency cepstral coefficients, a second derivative of Mel-frequency cepstral coefficients, and acoustic energy.

13. The computer-readable storage medium of claim 11, wherein a visual feature associated with the visual input comprises one of a parametric feature, an appearance-based feature, dimensions of a mouth region, image region intensity, discrete cosine transformations, image saturation, image brightness, image texture, video motion, head movement, one of movement of a specific item relative to other items and movement of the specific item to a background, micro-expressions on a person's face, extremity of expression, detected lighting changes, head angle relative to a camera, and local binary patterns.

14. The computer-readable storage medium of claim 11, wherein the original features are associated with a video frame.

* * * * *